US009525536B1

(12) United States Patent
Prock et al.

(10) Patent No.: US 9,525,536 B1
(45) Date of Patent: Dec. 20, 2016

(54) RESOURCE MANAGEMENT BASED ON COVERAGE COMPARISON

(71) Applicant: Sprint Spectrum L.P., Overland Park, KS (US)

(72) Inventors: John W. Prock, Raymore, MO (US); Young Zhao, Overland Park, KS (US); Sreekar Marupaduga, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 314 days.

(21) Appl. No.: 14/087,802

(22) Filed: Nov. 22, 2013

(51) Int. Cl.
| | |
|---|---|
| *H04L 5/00* | (2006.01) |
| *H04W 36/00* | (2009.01) |
| *H04W 28/00* | (2009.01) |
| *H04W 72/08* | (2009.01) |
| *H04W 72/04* | (2009.01) |

(52) U.S. Cl.
CPC .............. *H04L 5/006* (2013.01); *H04W 36/00* (2013.01); *H04W 28/00* (2013.01); *H04W 72/04* (2013.01); *H04W 72/085* (2013.01)

(58) Field of Classification Search
CPC ............. H04W 28/00; H04W 28/0231; H04W 28/0247; H04W 28/0268; H04W 28/26; H04W 52/243; H04W 52/244; H04W 52/245; H04W 72/04; H04W 72/0426; H04W 72/0433; H04W 72/08; H04W 72/085; H04W 72/087; H04W 72/12; H04W 72/1205; H04W 72/1226; H04L 5/006

USPC .......... 455/450, 451, 452.1, 452.2, 464, 509
See application file for complete search history.

(56) References Cited

U.S. PATENT DOCUMENTS

| | | | |
|---|---|---|---|
| 2007/0097914 A1* | 5/2007 | Grilli ............... | H04W 36/0088 370/329 |
| 2012/0213123 A1* | 8/2012 | Futaki ..................... | H04L 5/001 370/254 |
| 2012/0282889 A1* | 11/2012 | Tanaka ................. | H04J 11/0053 455/405 |
| 2013/0083755 A1 | 4/2013 | Berberana Fernandez-Murias et al. | |
| 2013/0295976 A1* | 11/2013 | Patil ...................... | H04W 24/10 455/501 |
| 2014/0204765 A1* | 7/2014 | Chai ...................... | H04W 24/08 370/241.1 |

OTHER PUBLICATIONS

J. Chen and W. Tan, Abstract of "Predictive dynamic channel allocation scheme for improving power saving and mobility in BWA networks," Journal Mobile Networks and Applications, vol. 12, Issue 1, Jan. 2007.
S. Wu, "A Channel Quality-aware Scheduling and Resource Allocation Strategy for Downlink LTE Systems," Journal of Computational Information Systems, 8: 2, 695-707, Jan. 2012.

* cited by examiner

*Primary Examiner* — Thai Vu

(57) ABSTRACT

A base station or other entity in a wireless communication system detects high use of air interface resources and responsively identifies one or more served devices that have reported threshold similar coverage quality for the base station and for an adjacent base station. And the base station applies a limit to allocation of resources for each such identified device.

17 Claims, 3 Drawing Sheets

RESOURCE MANAGEMENT BASED ON COVERAGE COMPARISON

BACKGROUND

Unless otherwise indicated herein, the materials described in this section are not prior art to the claims and are not admitted to be prior art by inclusion in this section.

A typical cellular wireless network includes a number of base stations that radiate to define wireless coverage areas, such as cells and cell sectors, in which wireless communication devices (WCDs) (also known as user equipment devices (UEs)), such as cell phones, tablet computers, tracking devices, embedded wireless modules, and other wirelessly equipped communication devices, can operate. In turn, each base station may be coupled with network infrastructure that provides connectivity with one or more transport networks, such as the public switched telephone network (PSTN) and/or the Internet for instance. With this arrangement, a WCD within coverage of the network may engage in air interface communication with a base station and may thereby communicate via the base station with various remote network entities or with other WCDs served by the base station.

In general, a cellular wireless network may operate in accordance with a particular air interface protocol or "radio access technology," with communications from the base stations to WCDs defining a downlink or forward link and communications from the WCDs to the base stations defining an uplink or reverse link. Examples of existing air interface protocols include, without limitation, Orthogonal Frequency Division Multiple Access (OFDMA (e.g., Long Term Evolution (LTE)), Code Division Multiple Access (CDMA) (e.g., 1×RTT and 1×EV-DO), Wireless Interoperability for Microwave Access (WiMAX), and Global System for Mobile Communications (GSM), among others. Each protocol may define its own procedures for registration of WCDs, initiation of communications, handoff between coverage areas, and other functions.

In accordance with the air interface protocol, each coverage area may operate on particular frequency spectrum in the form of one or more ranges of radio frequency (RF) spectrum defining a frequency bandwidth of the coverage area. Depending on the air interface protocol, the coverage area may use different spectrum for its uplink and downlink or may use the same spectrum allocated over time or in another manner between its uplink and downlink. Further, various coverage areas of the network could use the same frequency spectrum as each other, with communications in adjacent coverage areas being modulated or otherwise encoded to distinguish one coverage area from another.

In each coverage area, the air interface may then be divided into a plurality of "resource blocks" for carrying communications wirelessly between the WCDs and the base station. These resource blocks may take various forms, depending on the air interface protocol. For instance, in a representative LTE system, the air interface may be divided over time into 0.5 millisecond timeslots, and in each timeslot the bandwidth of the coverage area may be divided into resource blocks each spanning 180 kHz. Thus, every 0.5 milliseconds, the air interface would define a number of 180 kHz resource blocks that would fit within the available bandwidth.

Further, the air interface may define various channels for communication between the WCDs and the base station. For instance, on the downlink, the air interface may define a pilot or reference channel on which the base station broadcast a signal that WCDs may monitor to evaluate coverage strength, a downlink control channel for carrying control signals from the base station to WCDs, and one or more downlink traffic channels for carrying communication traffic to WCDs And on the uplink, the air interface may define an uplink control channel for carrying control signals from WCDs to the base station, and one or more uplink traffic channels for carrying communication traffic from WCDs. These various channels may be defined in particular resource blocks or portions of resource blocks and/or may define or be divided into the resource blocks.

When a WCD first powers on or enters into coverage of a base station, the WCD may scan for and identify a strongest pilot or reference signal and may register with the network by transmitting a registration request or attach request to a base station providing that signal. This registration process may serve to notify the network of the WCD's presence in that base station's coverage area and to facilitate network authentication of the WCD. Once registered, the WCD may then be served by the base station in an idle mode or a connected (active) mode. In the idle mode, the WCD may generally monitor a downlink control channel for any page messages or other overhead information from the base station. And in the connected mode, the WCD may have an established radio link connection with the base station, through which to engage in communication of bearer data (e.g., user communication traffic) with the base station.

When a WCD is served in a connected mode by a particular base station, the base station (alone or with the assistance of associated network infrastructure) may manage assignment of resource blocks for use to carry communication traffic between the base station and the WCD. For instance, when a WCD has data to communicate on the Internet, the WCD may transmit to the base station a service request message informing the base station that the WCD has data to communicate, and the base station may then assign one or more upcoming resource blocks on the uplink for use by the WCD to transmit that data and may send to the WCD a control signal specifying the assigned resource block(s). The WCD may then transmit its data to the base station in the assigned resource block(s), and the base station may forward the data for transmission on the Internet. Likewise, when the base station has data to transmit to the WCD, the base station may assign one or more upcoming resource blocks on the downlink for use to carry that data and may send to the WCD a control signal specifying the assigned resource block(s), and the base station may transmit the data to the WCD in the assigned resource block(s).

OVERVIEW

In some systems, when a WCD is in relatively poor coverage of a base station, the base station may end up allocating a greater extent of resource blocks for communications with that WCD than for comparable communications with devices that are in better coverage. A reason for this is that, when a WCD is in poor coverage, it may be necessary to modulate communications between the WCD and the base station with a modulation and coding scheme (MCS) in which each resource block represents less data, to help minimize significant communication errors. For instance, in an LTE network, when the channel quality between a WCD and a serving base station is particularly poor, the base station and WCD may use a particularly low coding-rate MCS such as Quadrature Phase Shift Keying (QPSK), whereas when the channel quality between the WCD and the base station is particularly good, the base station and WCD may use a high-coding rate MCS such as Quadrature Amplitude Modulation (QAM) (e.g., 64-QAM).

Another reason for this is that, when a WCD is in poor coverage, it may be necessary to repeat transmissions of data between the WCD and the base station. For instance, applying a "hybrid automatic repeat-request" (Hybrid ARQ) procedure, if a base station transmits data to a WCD and the WCD does not receive the data or cannot properly decode the data, the WCD may transmit a negative acknowledgement (NAK) to the base station, which may cause the base station to retransmit the data to the WCD. Further, in a system such as LTE, a WCD that is in poor coverage may be arranged to automatically transmit multiple copies of each instance of data, to help ensure that the base station receives the data. These repeated transmissions of data would thus consume a greater extent of resource blocks.

Unfortunately, however, this means that WCDs in poor coverage of a base station may receive a disproportionate share of the base station's resource block allocation. In particular, over time, the base station may allocate a relatively larger portion of resource blocks in the base station's coverage area to WCDs in poor coverage than to WCDs in good coverage. In some cases, particularly at times of low usage, this may not pose a problem. However, when a base station's resource blocks are in high demand and low supply, this greater allocation of resource blocks for WCDs in poor coverage may ultimately prevent the base station from adequately serving other WCDs, which could create a user experience issue.

Disclosed herein is a method and corresponding system to help overcome a problem such as this. In accordance with the disclosure, a base station or other entity in a wireless communication system may detect that a base station's resources are in high use and may responsively identify one or more WCDs that are likely in poor coverage and apply a limit to allocation of resources for each such identified WCD. Optimally, to determine that a WCD is in poor coverage, the base station may compare coverage quality that the WCD detects from the base station with coverage quality that the WCD detects from at least one adjacent base station and may determine that those coverage qualities are threshold similar to each other. In that situation, the WCD may not be receiving relatively strong enough coverage from the adjacent base station to trigger handover to that base station, but the WCDs receipt of similar coverage from both base stations may cause the WCD to be perceive poor coverage from its serving base station, which may lead to greater use of the serving base station's resources as discussed above.

Accordingly, in one respect, disclosed is a method for managing resource allocation in a wireless communication system including a first base station that radiates to define a first coverage area and a second base station that radiates to define a second coverage area. The method is carried out while the first base station is serving a WCD but the second base station is not serving the WCD.

In accordance with the method, the system wirelessly receives from the WCD a report indicating (i) first coverage quality of the first base station as determined by the WCD and (ii) second coverage quality of the second base station as determined by the WCD. The system then compares the indicated first coverage quality of the first base station with the indicated second coverage quality of the second base station, to make a determination of whether the indicated first coverage quality is threshold similar to the indicated second coverage quality. And in response to that determination being that the indicated first coverage quality is threshold similar to the indicated second coverage quality, the method involves applying a limit on resource allocation to the WCD by the first base station while the first base station continues to serve the WCD and the second base station continues to not serve the WCD.

In another respect, disclosed is a wireless communication system that includes a first base station configured to provide first coverage, a second base station configured to provide second coverage, and a controller configured to allocate air interface resources of the first coverage, for use to carry communications between the first base station and a wireless communication device (WCD) when the WCD is served by the first base station and is not served by the second base station. In practice, for instance, the controller may be part of the first base station.

In the disclosed system, the controller is then further configured to carry out particular functions. For instance, the controller is configured to receive from the WCD, when the WCD is served by the first base station and is not served by the second base station, a report indicating first quality of the first coverage of the first base station as determined by the WCD and second quality of second coverage of the second base station as determined by the WCD. Further, the controller is configured to compare the indicated first quality with the indicated second quality and to make a determination, based on the comparing, of whether the indicated first quality is threshold similar to the indicated second quality. And still further, the controller is configured to respond to the determination being that the indicated first quality is threshold similar to the indicated second quality by applying a limit on the allocating of air interface resources for use to carry communications between the first base station and the WCD, while the WCD continues to be served by the first base station and not by the second base station.

In addition, in another respect, disclosed is a cellular base station that is configured to carry out various functions. For instance, the base station is configured to detect that the cellular base station is experiencing threshold high air interface resource utilization. Further, the base station is configured to respond to detecting the threshold air interface resource utilization by selecting at least one device served by the cellular base station, where that selecting is based at least on an indication of threshold poor channel quality between the cellular base station and the device.

Still further, the base station is configured receive from the selected device a report indicating first coverage quality determined by the device from the cellular base station and second coverage quality determined by the device from an adjacent base station that is not serving the device. Yet further, the base station is configured to make a determination that the indicated first coverage quality is threshold similar to the indicated second coverage quality, and, responsive to the determination, to apply a limitation on air interface resource allocation by the cellular base station for air interface communication between the cellular base station and the device, while continuing to serve the device rather than handing-over the device to be served by the adjacent base station.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Figure 1:
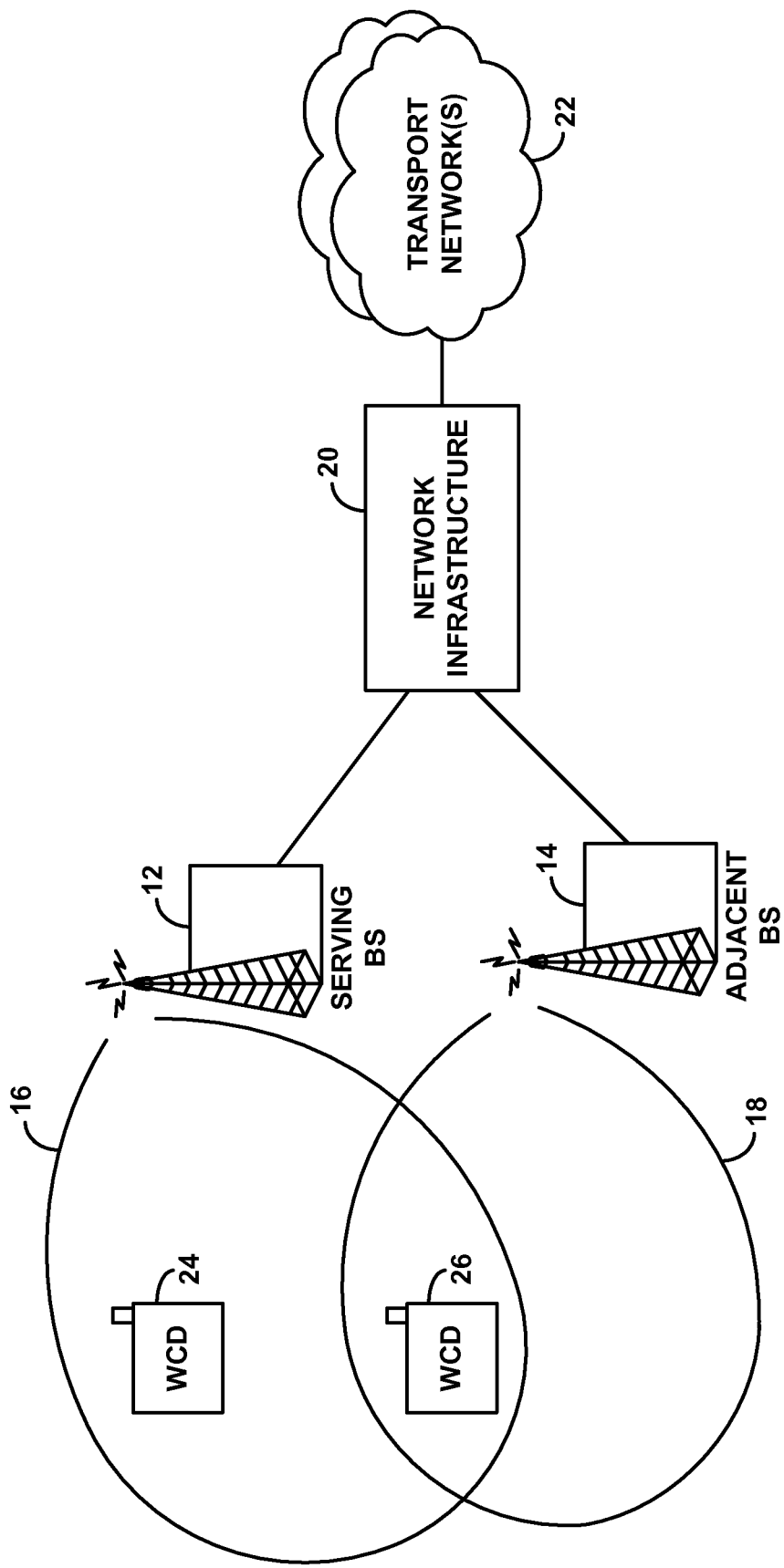
FIG. 1 is a simplified block diagram of an example network arrangement in which the present method can be implemented

Referring to the drawings, as noted above, FIG. 1 is a simplified block diagram of an example network arrangement in which the present method can be implemented. It should be understood, however, that this and other arrangements and processes described herein are set forth for purposes of example only, and other arrangements and elements (e.g., machines, interfaces, functions, orders of elements and functions, etc.) can be added or used instead and some elements may be omitted altogether. Those skilled in the art will also appreciate that many of the elements described herein are functional entities that may be implemented as discrete components or in conjunction with other components, in any suitable combination and location, and that various disclosed functions can be implemented by any combination of hardware, firmware, and/or software, such as by one or more processors programmed to execute computer instructions for instance.

As shown in FIG. 1, the example network arrangement includes two base stations 12, 14, each arranged to provide at least one respective wireless coverage area. In particular, base station 12 is shown radiating to define a first wireless coverage area 16, and base station 14 is shown radiating to define a second wireless coverage area 18. These coverage areas are shown as discrete oblong shapes but may, in reality, be less well defined. Further, in the example arrangement, both base stations are then coupled with common network infrastructure 20, such as a switch or gateway, that in turn provides connectivity with a transport network 22 such as the PSTN or the Internet.

Base stations 12 and 14 may operate according to any of a various air interface protocols, such any of those noted above for instance. Further, the base stations may operate according to the same air interface protocol as each other or may operate according to different air interface protocols.

As additionally shown, the base stations may be spaced apart from each other, with their respective coverage areas overlapping to some extent as shown, to provide for possible handoff of served WCDs from one coverage area to the other. Further depicted in the figure are then two representative WCDs 24, 26, which we can assume are both served by base station 12 and not by base station 14. In particular, both WCDs may be operating in a connected mode served by base station 12 and not by base station 14. WCD 24 is shown in positioned in coverage area 16 but not in coverage area 18, so that WCD 26 may receive signals from serving base station 12 but not from adjacent non-serving base station 14. Whereas, WCD 26 is shown positioned in coverage area 16 but not in coverage area 18, so that WCD 26 may receive signals from serving base station 12 but not from adjacent base station 14.

With this arrangement, WCD 24 may perceive a relatively high quality of coverage from serving base station 12, as WCD 24 may experience little if any interference from base station 14. Consequently, WCD 24 may report good channel quality to base station 12, and base station 12 and WCD 24 may communicate with each other using a high coding-rate MCS such as QAM.

On the other hand, WCD 26 may perceive a relatively low quality of coverage from base station 12, because WCD 26 may be experiencing interference from base station 14. In particular, because WCD 26 is positioned in the illustrated area of overlap between the coverage areas and is similarly spaced from both base station 12 and base station 14, WCD 26 may be receiving signals of similar strength from both base stations. In this situation, as discussed above, WCD 26 may not be receiving relatively strong enough coverage from base station 14 to trigger handover to that base station, but the WCDs receipt of similar coverage from both base stations may cause the WCD to be perceive poor coverage from serving base station 12. In this situation, WCD 26 may report poor channel quality to base station 12, and base station 12 and WCD 26 may therefore communicate with each other using a low coding-rate MCS such as QPSK.

As noted above, in a situation such as this, base station 12 may end up allocating a disproportionate share of its resource blocks to WCD 26. In particular, if WCD 24 and 26 are engaged in similar types and extents of communication, base station 12 may allocate a relatively greater extent of the resource blocks of coverage area 16 to WCD 24 than to WCD 26, as it may take more resource blocks to accomplish the communication with WCD 26 in poor coverage than with WCD 24 in good coverage.

Figure 2:
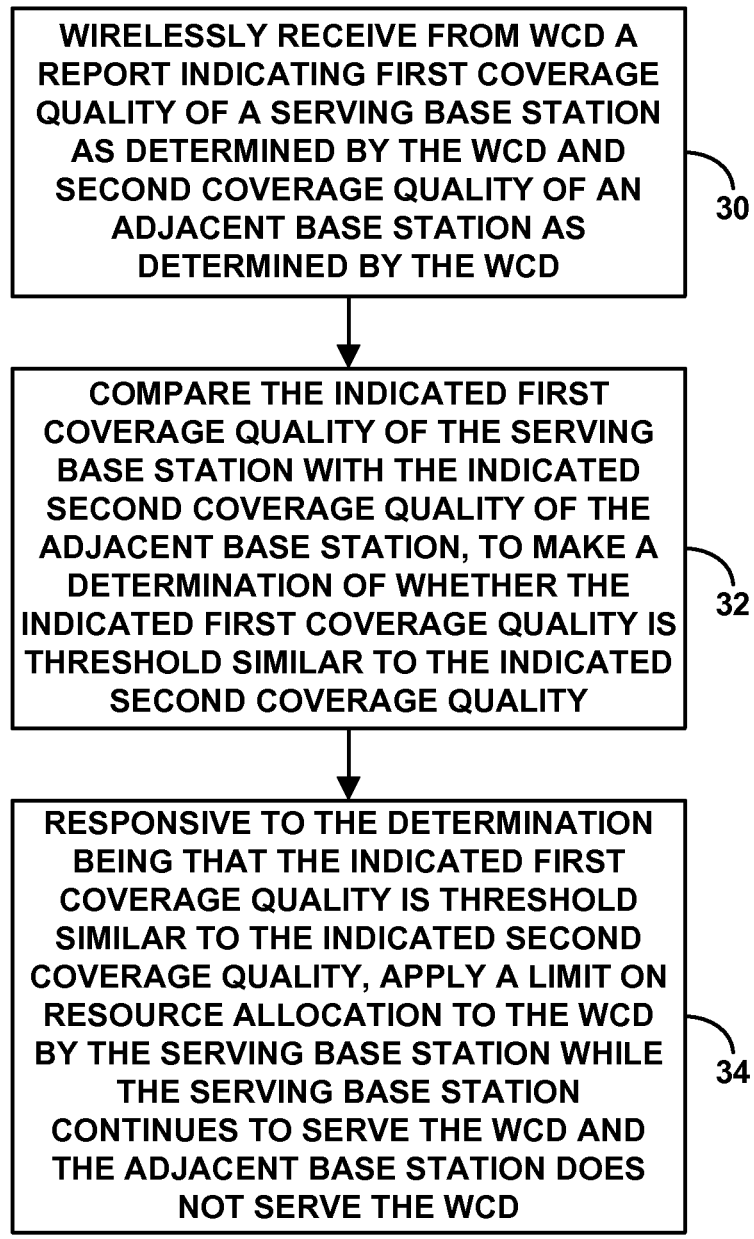
FIG. 2 is a flow chart depicting functions that can be carried out in accordance with an example of the method.

FIG. 2 is a flow chart depicting example functions that can be carried out to help avoid or minimize this problem. These functions may be carried out by the wireless communication system such as that shown in FIG. 1, such as by base station 12 and/or another entity, while base station 12 is serving WCD 26 but base station 14 is not serving WCD 26.

As shown in FIG. 2, at block 30, the method involves wirelessly receiving into the wireless communication system from WCD 26 a report indicating (i) first coverage quality of base station 26 as determined by WCD 26 and (ii) second coverage quality of the base station 14 as determined by the WCD. In turn, at block 32, the method involves the wireless communication system comparing the indicated first coverage quality of base station 12 with the indicated second coverage quality of base station 14, to make a determination of whether the indicated first coverage quality is threshold similar to the indicated second coverage quality. Further, at block 34, the method involves, responsive to the determination being that the indicated first coverage quality is threshold similar to the indicated second coverage quality, applying a limit on resource allocation to WCD 26 by first base station 12 while the base station 12 continues to serve WCD 26 and base station 14 continues to not serve WCD 26.

In this method, the act of receiving the report from WCD 26 may involve receiving the report from the WCD with or without the system having prompted the WCD to provide the report. Further, the received report could be in one or more parts, such as one or more report messages cooperatively defining the report. As a specific example, the WCD may periodically measure coverage quality from base station 12 and coverage quality from base station 14 and may autonomously report indications of the determined coverage quality to base station 12 in one or more messages on an uplink control channel, and base station 12 may thus receive a latest such report from the WCD.

As another example, base station 12 may encounter a trigger that causes base station 12 to request the WCD to provide such a report. For instance, base station 12 may receive from the WCD, in a service request or otherwise, a specification of channel quality determined by the WCD for the communication between the base station and the WCD (e.g., a channel quality indicator (CQI) based on observed signal-to-noise ratio, antenna configuration, and the like), and base station 12 may determine the specified channel quality to be lower than a predefined threshold level of channel quality. In response to that determination, the base station may then transmit to the WCD a request for the WCD to provide a measurement report. And the WCD may then respond to that request by measuring coverage quality and transmitting to the base station a report of the measured coverage quality. In this example, the WCD's measurement and report of coverage quality in response the base station's request may be just with respect to coverage quality from base station 14, as the earlier received specification of channel quality could already amount to a reported indication of coverage quality of base station 12. Alternatively, the WCD's measurement and report of coverage quality may address coverage quality respectively of both base station 12 and base station 14.

The indication of coverage quality for each base station can itself also take various forms. By way of example, the indication of coverage quality could be a measure of signal strength detected by the WCD from the base station, such as a measure of received pilot or reference signal power (e.g., a reference signal receive power (RSRP)), or a measure or total power received by the WCD from the base station. Alternatively or additionally, the indication of coverage quality could be a measure of signal to noise ratio, such as a ratio of received pilot or reference signal power to total detected spectral energy (e.g., a reference signal receive quality (RSRQ)) as determined by the WCD. And still alternatively or additionally, in line with the note above, the indication of coverage quality could be a measure of channel quality (e.g., a CQI) that takes into account factors such as detected signal-to-noise ratio, antenna configuration, WCD receiver type, and so forth.

In turn, the act of comparing the indicated first coverage quality of base station 12 with the indicated second coverage quality of base station 14, to make a determination of whether the indicated first coverage quality is threshold similar to the indicated second coverage quality, can also take various forms. For instance, this act may involve determining a difference between the indicated first coverage quality and the indicated second coverage quality, and comparing the determined difference to a predefined threshold difference, which could be any difference predefined to represent threshold similarity. In that case, the determination could then be that the indicated first coverage quality is threshold similar to the indicated second coverage quality only if the determined difference is no greater than the predefined threshold difference. The theory here, as noted above, is that the WCD in this scenario may be receiving enough interference from base station 14 to pose the present resource allocation issue but the relative coverage quality may not be sufficient to justify handover of the WCD to the base station 14.

In practice, the predefined threshold difference could be a set value that the system uses when comparing coverage quality between any two base stations. Alternatively, the predefined threshold difference could be set to a specific value respectively for each of various base station pairs, based on a distance between the base stations for instance. Such thresholds could be listed in a table that the system references based on the base stations at issue in order to determine which predefined threshold distance to apply. By way of example, if the base stations are relatively close together, the threshold could be smaller, whereas if the base stations are relatively far apart, the threshold could be larger. Alternatively, other distance-threshold relationships could be defined, and other factors could be taken into account as well.

The act of applying the limit on resource allocation to the WCD may then also take various forms. By way of example, this act may involve reducing a baseline resource allocation that the system determined for the WCD and applying the reduced resource allocation instead of the baseline resource allocation. For instance, the system may determine a channel quality for communication between the WCD and base station 12, such as by receiving a QCI from the WCD, and may determine based on that determined channel quality an MCS to use for communication between base station 12 and the WCD, such as by referencing a predefined table that correlates various values of QCI with corresponding modulation schemes and coding rates. Given the determined MCS, and perhaps given a report from the WCD indicating an extent of data that the WCD has buffered or otherwise wishes to transmit, or request from the WCD to transmit at a particular data rate, the system may then determine the baseline allocation of certain upcoming resource blocks for the WCD as a number of resource blocks that would be necessary to achieve a desired extent of the transmission. In response to having determined that the indicated coverage quality from the serving base station 12 is threshold similar to the indicated coverage quality from adjacent base station 14, the system may then throttle that baseline allocation of resource blocks, by reducing it to some extent and leaving some of the data until a later time segment to transmit to the WCD.

As another example, the act of applying the limit on resource allocation to the WCD may involve more generally deciding to not allocate a given resource block to the WCD. This could occur in various scenarios and ways. For instance, in the example above, this could involve having decided to allocate a resource block to the WCD and then changing the decision to not allocate that resource block to the WCD, so as to free up the resource block for allocation to another WCD instead. Alternatively, this could involve a scenario where two WCDs, such as WCD 24 and WCD 26, are competing for allocation of resource blocks, in which case the system may decide to allocate a given resource block to WCD 24 instead of to WCD 26.

Although not shown in FIG. 2, the entire process depicted could be carried out in a scenario where base station 12 is experiencing a particularly high rate of resource block allocation. For instance, the system could determine that the base station is going to be allocating greater than some predefined percentage of upcoming resource blocks (such as of all resource blocks in an upcoming timeslot) and/or that the base station has been allocating such an extent of resource blocks. In response to determining that the resource block allocation rate of base station 12 exceeds a predefined resource allocation rate threshold, the system may then carry out the comparing and applying functions depicted in FIG. 2.

As noted above, the functions described herein can be carried out in a system operating according to any of a variety of air interface protocols. By way of example, and without limitation, both base stations 12, 14 could be LTE eNodeBs, each radiating to define an LTE air interface. In accordance with LTE principles, the LTE air interface of each coverage area 14, 16 may thus be divided over time into 1 millisecond subframes each defining two 0.5 millisecond segments of time, with the operating frequency bandwidth of the coverage area being divided in every time segment into numerous resource blocks. Thus, over time, a serving eNodeB may assign particular upcoming resource blocks for use to carry communications between served WCDs and the eNodeB.

With such an arrangement, a serving eNodeB may keep track of its rate of resource block allocation so as to determine that the resource block allocation (e.g., in an upcoming subframe and/or over recent time) is threshold high. In response, the eNodeB may then refer to its records to identify, of one or more WCDs served by the eNodeB, each WCD whose most recently reported CQI is less than or equal to a particular QCI threshold for resource block throttling.

For each such WCD, the serving eNodeB may then transmit to the WCD a control message requesting the WCD to provide a measurement report. And the WCD may responsively then evaluate coverage from the serving eNodeB and one or more adjacent eNodeBs, such as by measuring and determining RSRP and/or RSRQ of each such eNodeB and may transmit in response to the eNodeB a measurement report specifying the determined coverage quality of each eNodeB. The serving eNodeB may then determine if the RSRP and/or RSRQ reported for the serving eNodeB is below a predefined threshold but not so low as to trigger handover of the WCD. And if that condition is met, the serving eNodeB may then evaluate further to determine whether to apply a limit on resource block allocation for the WCD. In particular, for each adjacent eNodeB, the serving eNodeB may compare the reported coverage quality that the WCD detected from it with the reported coverage quality that the WCD detected from the adjacent eNodeB, to determine whether those coverage qualities are threshold similar. And if the serving eNodeB determines for at least one such adjacent eNodeB that the reported coverage qualities are threshold similar, the eNodeB may then apply a limit to resource block allocation to the WCD, in line with the discussion above.

Figure 3:
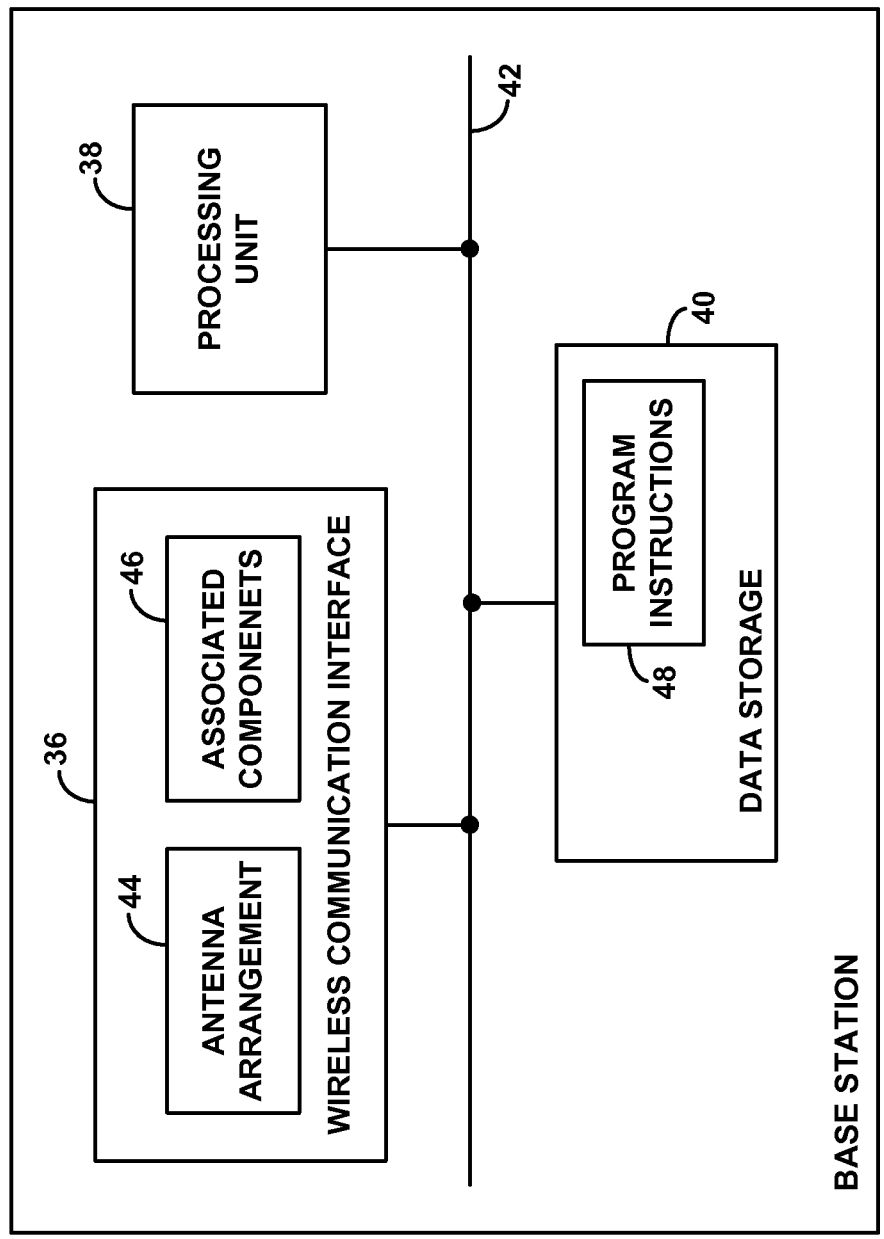
FIG. 3 is simplified block diagram of a base station arranged to carry out various described functions.

FIG. 3 is a simplified block diagram of an example base station that could be configured to carry out features of the present method. By way of example, this figure could represent components of base station 12.

As shown in FIG. 3, the representative base station may include a wireless communication interface 36, a processing unit 38, and data storage 40, all of which may be coupled together by a system bus, network or other connection mechanism 42.

As shown, wireless communication interface 30 may comprise an antenna arrangement 44, which may be tower mounted, and associated components 46 such as a cell site modem for engaging in air interface communication with WCDs, such as to transmit data and control information to the mobile terminals and receive data and control information from the mobile terminals.

Processing unit 38 may then comprise one or more general purpose processors (e.g., microprocessors) and/or special-purpose processors (e.g., digital signal processors and/or application specific integrated circuits) and may be integrated in whole or in part with the wireless communication interface 36. And data storage 40 may comprise one or more volatile and/or non-volatile storage components and may be integrated in whole or in part with processing unit 38.

As shown, data storage 40 may hold program instructions 48, which may be executable by processing unit 32 to carry out various functions of the base station, or more generally of the wireless communication system, as described herein.

For instance, in accordance with the program instructions, the processing unit may function to track resource block allocation, detect threshold high rate of resource block allocation, responsively identify a served WCD that has a low reported CQI and request the WCD to provide a measurement report, compare resulting reported indications of coverage quality of the base station and of an adjacent base station to determine if they are threshold similar, and responsive to detecting such threshold similarity, limiting an allocation of resource blocks to the WCD.

In practice, the processing unit, data storage, and program instructions of this example base station may define a controller that is arranged to manage various functions described herein. Alternatively, however, a controller managing those functions could be provided external to the base station, such as in another element of the wireless communication system, which may in turn manage functions of the base station such as directing the base station to apply the limit on allocation of resource blocks to the WCD at issue for instance.

Thus, in an example implementation of the present disclosure, a serving cellular base station could be configured to carry out various functions to manage allocation of air interface resources. For instance, the base station may be configured to detect that the cellular base station is experiencing threshold high air interface resource utilization. Further, the cellular base station may be configured to respond to detecting the threshold air interface resource utilization by selecting at least one device served by the cellular base station, where the selecting is based at least on an indication of threshold poor channel quality between the cellular base station and the device.

Still further, the cellular base station may be configured to receive from the selected device a report indicating first coverage quality determined by the device from the cellular base station and second coverage quality determined by the device from an adjacent base station that is not serving the device. And the cellular base station may be configured to make a determination whether the indicated first coverage quality is threshold similar to the indicated second coverage quality, and, responsive to the determination being affirmative, to apply a limitation on air interface resource allocation by the cellular base station for air interface communication between the cellular base station and the device, while continuing to serve the device rather than handing-over the device to be served by the adjacent base station.

Exemplary embodiments have been described above. Those skilled in the art will understand, however, that changes and modifications may be made to these embodiments without departing from the true scope and spirit of the invention.

What is claimed is:

1. A method for managing resource allocation in a wireless communication system including a first base station that radiates to define a first coverage area and a second base station that radiates to define a second coverage area, the method comprising, while the first base station is serving a wireless communication device (WCD) but the second base station is not serving the WCD:

wirelessly receiving into the wireless communication system from the WCD a report indicating (i) first coverage quality of the first base station as determined by the WCD and (ii) second coverage quality of the second base station as determined by the WCD;

comparing, by the wireless communication system, the indicated first coverage quality of the first base station with the indicated second coverage quality of the second base station, to make a determination of whether the indicated first coverage quality is threshold similar to the indicated second coverage quality; and responsive to the determination being that the indicated first coverage quality is threshold similar to the indicated second coverage quality, applying a limit on resource allocation to the WCD by the first base station while the first base station continues to serve the WCD and the second base station continues to not serve the WCD, wherein the method further comprises determining by the first base station a baseline allocation of resource blocks for the WCD, wherein determining the baseline allocation of resource blocks for the WCD comprises (i) determining a channel quality for communication between the first base station and the WCD, (ii) determining, based on the determined channel quality, a modulation and coding scheme for communication between the first base station and the WCD, and (iii) determining the baseline allocation based on the determined modulation and coding scheme, and wherein applying the limit on resource allocation by the first base station to the WCD comprises throttling allocation of resource blocks for the WCD from the baseline allocation to a reduced allocation.

2. The method of claim 1, wherein the wirelessly receiving, comparing, and applying the limit are done by the first base station.

3. The method of claim 2, wherein the report indicating the first coverage quality and the second coverage quality specifies each of the first coverage quality and the second coverage quality by at least one metric selected from the group consisting of (i) reference signal receive power and (ii) reference signal receive quality.

4. The method of claim 2, further comprising, while the first base station is serving the WCD and the second base station is not serving the WCD:

receiving, by the first base station, a channel quality indicator (CQI) from the WCD, the CQI specifying a quality of a communication channel between the first base station and the WCD;

determining, by the first base station, that communication channel quality specified by the received CQI is threshold low; and responsive to the determining that the received CQI is threshold low, transmitting by the first base station to the WCD a measurement report request, wherein the receiving of the indication of first coverage quality and the indication of second coverage quality is in response to the transmitting of the measurement report request.

5. The method of claim 1, wherein the comparing to make the determination comprises:

determining a difference between the indicated first coverage quality and the indicated second coverage quality, and comparing the determined difference to a predefined threshold difference;

wherein the determination is that the indicated first coverage quality is threshold similar to the indicated second coverage quality only if the determined difference is no greater than the predefined threshold difference.

6. The method of claim 5, wherein the predefined threshold difference is predefined specifically for the first base station and the second base station, based on a distance between the first base station and the second base station.

7. The method of claim 1, wherein applying the limit on resource block allocation by the first base station to the WCD comprises deciding to not allocate a given resource block to the WCD.

8. The method of claim 7, wherein deciding to not allocate the given resource block to the WCD comprises deciding to allocate the given resource block to a different WCD instead.

9. The method of claim 1, carried out in response to determining that a resource allocation rate of the first base station exceeds a predefined resource allocation rate threshold.

10. The method of claim 1, wherein the first base station is a Long Term Evolution (LTE) eNodeB, and wherein the second base station is also a LTE eNodeB, and wherein the resource allocation comprises allocation of one or more LTE resource blocks.

11. A wireless communication system comprising:

a first base station configured to provide first coverage;

a second base station configured to provide second coverage; and a controller configured to allocate air interface resources of the first coverage, for use to carry communications between the first base station and a wireless communication device (WCD) when the WCD is served by the first base station and is not served by the second base station, and wherein the controller is further configured to (a) receive from the WCD, when the WCD is served by the first base station and is not served by the second base station, a report indicating first quality of the first coverage of the first base station as determined by the WCD and second quality of second coverage of the second base station as determined by the WCD, (b) compare the indicated first quality with the indicated second quality and make a determination, based on the comparing, of whether the indicated first quality is threshold similar to the indicated second quality, and (c) respond to the determination being that the indicated first quality is threshold similar to the indicated second quality by applying a limit on the allocating of air interface resources for use to carry communications between the first base station and the WCD, while the WCD continues to be served by the first base station and not by the second base station, wherein the controller is further configured to determine a baseline allocation of resource blocks for the WCD, wherein determining the baseline allocation of resource blocks for the WCD comprises (i) determining a channel quality for communication between the first base station and the WCD, (ii) determining, based on the determined channel quality, a modulation and coding scheme for communication between the first base station and the WCD, and (iii) determining the baseline allocation based on the determined modulation and coding scheme, and wherein applying the limit on resource allocation by the first base station to the WCD comprises throttling allocation of resource blocks for the WCD from the baseline allocation to a reduced allocation.

12. The wireless communication system of claim 11, wherein the controller is part of the first base station.

13. The wireless communication system of claim 11, wherein the controller is further configured to detect threshold high utilization of air interface resources of the first coverage and, responsive to the detecting, to carry out the comparing and the applying of the limit.

14. The wireless communication system of claim 11, wherein the first base station is a Long Term Evolution (LTE) eNodeB, and wherein the air interface resources are LTE resource blocks.

15. The wireless communication system of claim 11, wherein applying the limit comprises deciding to not allocate a given resource block to the WCD.

16. A cellular base station configured to:
 (a) detect that the cellular base station is experiencing threshold high air interface resource utilization,
 (b) responsive to detecting the threshold air interface resource utilization, select at least one device served by the cellular base station, the selecting being based at least on an indication of threshold poor channel quality between the cellular base station and the device,
 (c) receive from the selected device a report indicating first coverage quality determined by the device from the cellular base station and second coverage quality determined by the device from an adjacent base station that is not serving the device,
 (d) make a determination of whether the indicated first coverage quality is threshold similar to the indicated second coverage quality, and
 (e) responsive to the determination being that the indicated first coverage quality is threshold similar to the indicated second coverage quality, apply a limitation on air interface resource allocation by the cellular base station for air interface communication between the cellular base station and the device, while continuing to serve the device rather than handing-over the device to be served by the adjacent base station.

17. The cellular base station of claim 16, wherein applying the limitation comprises at least one function selected from the group consisting of (i) throttling resource allocation from a baseline level determined for the device and (ii) deciding to not allocate a given resource block to the device.

* * * * *